United States Patent Office 3,632,491
Patented Jan. 4, 1972

3,632,491
BIS-TRIAZINYLAMINOSTILBENE COMPOUNDS
Hyman William Zussman, Scarsdale, N.Y., and Heinrich Hausermann, Riehen, near Basel, Switzerland, assignors to Geigy Chemical Corporation, Greenburgh, N.Y.
No Drawing. Application Nov. 12, 1965, Ser. No. 507,583, now Patent No. 3,459,743, dated Aug. 5, 1969, which is a continuation-in-part of application Ser. No. 412,845, Nov. 20, 1964. Divided and this application Aug. 21, 1968, Ser. No. 777,521
Claims priority, application Switzerland, Nov. 24, 1964, 14,991/64
Int. Cl. C11d 3/28, 3/42
U.S. Cl. 252—524
1 Claim

ABSTRACT OF THE DISCLOSURE

Certain 4,4' - bis[4''-(2,6-dimethylmorpholino)-1'',3'',5''-triazinyl-(2'')-amino]-stilbene-2,2' - disulfonic acids are useful for the optical brightening of washing agents such as anionic and nonionic detergents and cellulose material as well as polyamide materials such as nylon. Representative compounds are 4,4'-bis[4''-(2,6-dimethylmorpholino)-6''-phenylamino - 1'',3'',5'' - triazinyl-(2'')-amino]-stilbene-2,2',-disulphonic acid and 4,4'-bis-[4''-(2,6 - dimethylmorpholino)-6''-ethoxy-1'',3'',5''-triazinyl-(2'')-amino]-stilbene-2,2'-disulphonic acid.

CROSS REFERENCE TO RELATED APPLICATIONS

This application is a divisional application of our co-pending application Ser. No. 507,583, filed Nov. 12, 1965, now U.S. 3,459,743 which in turn is a continuation-in-part of application Ser. No. 412,845, filed Nov. 20, 1964, now abandoned.

The present invention concerns new optical brighteners of the stilbene series, and a process for the production thereof. In a first aspect, the invention relates to a group of such new brighteners useful for the optical brightening of washing agents and of cellulose materials, in particular cotton textile materials as well as industrial products, the washing agents and cellulose materials having a content of the new optical brighteners.

In a second aspect, the invention relates to a group of the aforesaid new brighteners which are useful for the optical brightening of paper-type cellulose materials and for polyamide materials especially nylon as well as, as industrial products, the paper and polyamide materials of improved appearance having a content of the new optical brighteners.

Under the first aspect of this invention, valuable optical brighteners of the stilbene series are obtained by reacting 2 mols of 2,4,6-trihalogen-1,3,5-triazine, preferably the corresponding trichlorotriazine, in any order desired, with 1 mol of 4,4'-diaminostilbene-2,2'-disulfonic acid or a salt thereof, with 2 mols of 2,6-dimethylmorpholine and with 2 mols of arylamine of the formula $$H_2N-Ar \qquad (I)$$

wherein Ar represents unsubstituted phenyl or phenyl substituted by halogen or by lower alkyl, alkoxy or alkanoylamino groups, or the naphthyl-(1) radical, to form a compound of formula If Ar is halogen-substituted phenyl then this substituent is fluorine, chlorine or bromine; alkyl, alkoxy and alkanoylamino substituents of Ar preferably contain up to 6 carbon atoms. Preferably, however, Ar is the phenyl radical or a methylphenyl radical.

Preferably, 2,4,6-trihalogen-1,3,5-triazine is reacted in a first step with a soluble salt, for example with an alkali metal salt of 4,4'-diaminostilbene-2,2'-disulfonic acid and in the second and third steps with the 2,6-dimethyl morpholine and the arylamine of Formula I. However, the trihalogen-1,3,5-triazine can also be reacted in the second step with the 4,4'-diaminostilbene-2,2'-disulfonic acid or a soluble salt thereof and in the first and third steps with 2,6-dimethyl morpholine and with arylamine. In any case, the first step of the reaction is preferably performed at a temperature of 0 to 10° C., the second step at 5 to 60° C. and the third step at 60 to 95° C. The reaction is advantageously performed in aqueous or aqueous-organic solution, the organic component of the solution consisting of lower aliphatic ketones such as acetone or methylethyl ketone or water soluble cyclic ethers such as dioxan, and in the presence of an acid binding agent such as alkali carbonates and alkali bicarbonates or alkali hydroxides. When 2,6-dimethyl morpholine is used in the last step of the reaction, it is advantageous to use an excess thereof, the excess serving as acid binding agent. If arylamine of Formula I is used for the third step of the reaction, then the reaction is advantageously performed in an acid medium, e.g. at a pH of 4 to 5.

The new stilbene compounds according to the invention, of Formula II, are advantageously isolated from the reaction mixture in the form of the alkali salts or the free disulfonic acids.

They are suitable chiefly for the optical brightening of washing agents. This distinguishes them from the known compounds corresponding in structure to those of Formula II, except that the morpholino radicals in the molecule are unsubstituted. These known dyestuffs cause a vivid yellow discoloration of washing agents, which is most undesirable in the industry.

Suitable washing agents contain, as wash-active agents, for example anion active compounds, e.g. alkali metal salts, particularly sodium salts, of higher fatty acids, alkylaryl sulfonates, mainly dodecylbenzene sulfonate or tetrapropylbenzene sulfonate, sec. alkyl sulfates having a higher secondary alkyl radical, fatty alcohol sulfates such as dodecyl sulfate, or sulfated addition products of 2 to 3 mols of ethylene oxide to dodecyl alcohol, or non-ionic compounds such as fatty alcohol polyglycol ethers or higher alkylphenol polyglycol ethers. In addition, the washing agents can contain the usual fillers and auxiliaries usual in the textile finishing industry, for example, alkali polyphosphates and alkali polymetaphosphates, alkali silicates, alkali borates, alkali metal salts of carboxymethyl cellulose, foam stabilizers such as hydroxyalkylamides of higher fatty acids, or complex compounds such as soluble salts of ethylenediamine tetraacetic acid.

The washing agents are brightened by incorporating the stilbene compounds of Formula II according to the invention thereinto in the usual ways. This is done ad-

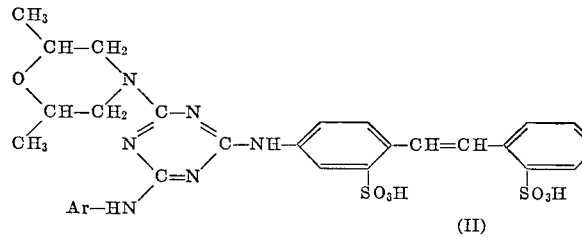  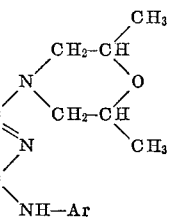

(II)

wherein Ar has the meaning given in Formula I.

vantageously by stirring the stilbene compounds with the washing agents in water to form a slurry and then drying the latter.

The white aspect of a detergent powder is very important to the detergent manufacturer as a control test. A discoloration of the detergent indicates that something has gone wrong during the production. Any detergent discoloration caused by the brightener would impede such a color control.

The content of optical brightener of Formula II according to the invention in the washing agent is advantageously 0.005 to 0.5% (calculated on the washing agent). Washing agents containing these optical brighteners have a greatly improved, more white appearance in daylight than those not containing such brighteners.

The new stilbene compounds of Formula II draw onto cellulose material, particularly cotton, especially when free from synthetic resin finishes, from aqueous solution, particularly also from aqueous solutions containing washing agents of the type mentioned above. Their use on nylon and the like synthetic polyamide materials is not recommended since they lack drawing power on such materials. Also on synthetic resin finished cotton and the like goods, the brighteners falling under the second aspect of this invention are to be preferred.

Aqueous textile treatment solutions preferably contain 0.001 to 0.2% of brightener of Formula II (calculated on the weight of the material to be brightened). Cellulose material treated with an aqueous solution containing such brighteners is given a pleasant, pure white, blue-violet fluorescent appearance.

Optical brighteners of Formula II according to the invention brighten washing agents considerably more strongly than previous known brighteners of a similar constitution. This is also true when the optical brighteners according to the invention are incorporated into the washing agents in the form of their aqueous or aqueous/organic solutions. Another advantage of the brighteners according to the invention is that there is a good improvement in the degree of whiteness of the cellulose material, even after repeated washing, without any undesirable change in shade.

By "cellulose material" as used in this application, there are meant both natural cellulose such as cotton, hemp, jute or ramie as well as regenerated cellulose such as staple fiber, or, especially in the second aspect of the invention, paper; by polyamide material is meant especially synthetic polyamide such as nylon, perlon.

Under the second aspect of the invention, valuable optical brightening agents of the stilbene series are obtained if 2 mols of 2,4,6-trihalogen-1,3,5-triazine, particularly 2,4,6-trichloro-1,3,5-triazine, is reacted in any order desired with 1 mol of 4,4'-diaminostilbene-2,2'-disulfonic acid or a soluble salt thereof, with 2 mols of 2,6-dimethyl morpholine and, optionally, also with 2 mols of an optionally substituted lower alkanol, lower aliphatic mercaptan, ammonia or a primary or secondary amine of the formula

(III)

wherein $R_1$ represents hydrogen or a lower, optionally substituted, alkyl group and $R_2$ represents a lower, optionally substituted, alkyl group or an aryl, and especially a phenyl radical, which is substituted by lower alkyl-sulfonyl or by acid salt-forming groups, more in particular sulfonic acid or carboxyl groups;

or $R_1$ and $R_2$ together with the nitrogen atom to which they are linked form a heterocyclic, N-containing ring, to form a compound of the formula

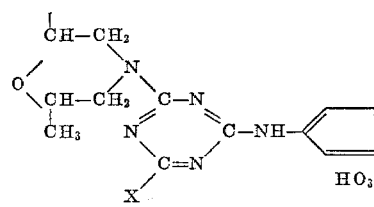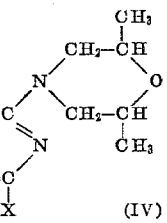
(IV)

wherein

X represents chlorine, an optionally substituted lower alkoxy, lower alkylthio, the amino group or a substituted amino group of the formula

wherein $R_1$ and $R_2$ have the meanings given in Formula III.

If $R_1$ and $R_2$ in Formula III represent a lower alkyl group then this, advantageously, has 1 to 4 carbon atoms. If this alkyl group is substituted, then the substituents are particularly those non-coloring substituents usual in brightening agents, i.e. the hydroxyl group, alkoxy groups having advantageously 1 to 4 carbon atoms, the sulfonic acid group, carboxylic acid group, sulfonic acid amide group, carboxylic acid amide group, or aromatic groups, mainly the phenyl group substituted as defined in connection with Formula IV. If $R_2$ is an aryl radical substituted by acid salt-forming groups, then mainly the sulfonic acid group but also the carboxylic acid group or a disulfimide group are meant by acid salt-forming groups. The aryl group bearing these acid salt-forming groups can be additionally substituted by non-coloring substituents usual in optical brightening agents such as lower alkyl or alkoxy groups or halogen.

If $R_1$ and $R_2$ together with the nitrogen atom form a ring then this is, e.g. a five-membered ring such as the pyrrolidine ring, or a six-membered ring such as the piperidine, morpholine or 2,6-dimethyl morpholine ring.

If X is a lower alkoxy or alkylthio group then this advantageously has 1 to 4 carbon atoms. If these groups are substituted, then mainly the hydroxyl group or lower alkoxy groups are substituents.

The reaction of the 4,4'-diaminostilbene-2,2'-disulfonic acid or a soluble salt thereof with the triazine compound is advantageously performed as a first or second step. The temperature for this condensation is, in the first step preferably 0 to 10° C., in the second step 0 to 60° C. and in the third step 60 to 95° C. The condensation is advantageously performed in aqueous or aqueous-organic solution, the organic part of the solution consisting of lower aliphatic ketones such as acetone or methylethyl ketone, or water soluble cyclic ethers such as dioxan, and in the presence of an acid binding agent such as alkali carbonates, and alkali bicarbonates or alkali hydroxides. If 2,6-dimethyl morpholine or a non-aromatic amine of Formula III is reacted in the last step it is advantageous to use an excess thereof; the excess serves as acid binding agent. If a compound of Formula III, wherein $R_2$ is an aryl group substituted by acid salt-forming groups, is reacted in the last step the reaction is advantageously performed in acid pH range, e.g. at a pH of 2 to 5.

Particularly suitable compounds of Formula IV are obtained by reacting 2 mols of 2,4,6-trihalogen-1,3,5-triazine with 1 mol of 4,4'-diaminostilbene-2,2'-disulfonic acid or a soluble salt thereof and 2 mols of 2,6-dimethyl morpholine without further reaction, or by further reacting with 2 mols of a lower alkanol or with 2 mols of an aminobenzene sulfonic acid which may be substituted by chlorine, lower alkyl or lower alkoxy groups.

The new stilbene compounds of Formula IV according to the invention are advantageously isolated from the reaction mixture in the form of their alkali metal salts or free acids.

The new brighteners falling under this second aspect of the invention are especially suitable for the optical brightening of cellulose materials and synthetic polyamide material, on which materials they draw well from aqueous solution, especially from acid baths. They do so even in the cold, a property which is very important in paper manufacture.

As compared with known morpholino-substituted compounds of otherwise similar structure, these brighteners show on cellulosic material, including cotton, an unexpectedly improved wash fastness. Also their fastness to chlorine is very satisfactory.

The content of whiteners of Formula IV in aqueous textile treatment liquors is advantageously 0.01 to 1.0% calculated on the weight of the material to be brightened. The cellulose material treated with an aqueous solution containing such brightener is given a pleasant, pure white appearance having a blue-violet fluorescence.

Particularly advantageous properties of the stilbene compounds according to this aspect of the invention, are their high grade substantivity, combined with their good stability to acids, e.g. acetic acid, and to salts which are conventionally used in textile finishing or paper production such as magnesium chloride, zinc chloride, zinc nitrate, zinc borotetrafluoride or aluminum sulfate. The latter property is especially outstanding in those brighteners of Formula IV wherein X is an alkoxy group or a sulfophenyl-amino group. The new brighteners of Formula IV are hence useful in baths which contain precondensates suitable for the synthetic resin-finishing of cellulose materials, e.g. water-soluble methylol derivatives of urea or of other organic nitrogen compounds, as well as catalysts necessary for the polycondensation of such precondensates such as zinc chloride or magnesium chloride. Due to their good resistance to acid salts, e.g. aluminum sulfate, the new stilbene compounds are sitable for the brightening of sized paper in the pulp. This property is particularly advantageous in cases where so-called back water, which often contains a relatively high percentage of acid aluminum salt, is used for paper manufacture.

The brightening of polyamide is preferably performed in an aqueous bath containing acids, e.g. formic or acetic acid.

Another favourable property of the brightening agents according to this aspect of the invention, and particularly those of Formula IV in which X represents alkoxy, resides in that, even when large quantities are used, the material brightened therewith is not given an undesirable green tinge.

The following non-limitative examples illustrate the two aspects of the invention. Temperatures are given in degrees centigrade. Where not otherwise stated parts and percentages are given by weight. The relationship of parts by weight to parts by volume is as that of grams to milliliters.

Example 1

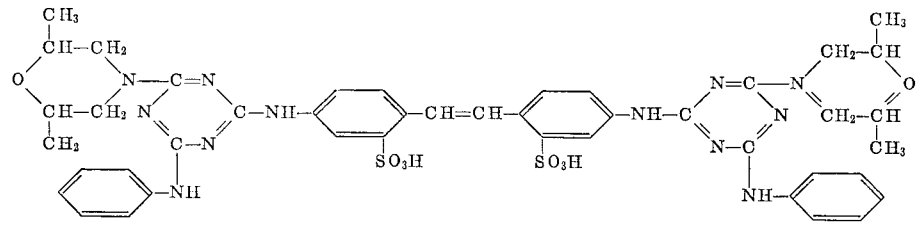

75 parts of 2,4,6-trichloro-1,3,5-triazine are dissolved in 700 parts by volume of acetone. The solution is added to a mixture of 1800 parts of a mixture of ice and water while stirring. A solution of 82.2 parts of the sodium salt of 4,4'-diamonstilbene-2,2'-sulphonic acid and 21.5 parts of sodium carbonate in 950 parts of water is poured, within 1 hour at 0–5°, into the suspension of the triazine mentioned above while stirring well. At 5–15°, a solution of 37.2 parts of phenylamine in 100 parts by volume of acetone is added dropwise to the yellowish suspension formed of the disodium salt of 4,4'-bis-[4'',6''-dichloro-1'',3'',5'' - triazinyl-(2'')-amino]-stilbene-2,2'-disulphonic acid and the acid liberated is neutralised by the simultaneous addition of an aqueous solution of 22 parts of sodium carbonate. The yellowish suspension is then stirred at 20° until the phenylamine has completely disappeared. At 65–75°, 58 parts of 2,6-dimethyl morpholine and an aqueous solution of 16 parts of sodium hydroxide are then added simultaneously within 15 minutes while stirring. On completion of the addition, the temperature of the reaction mixture is raised to 90° and the acetone is distilled off through a sloping condenser. After adding 4 parts of sodium hydroxide, the mixture is stirred for another hour at 90–100°. In this way, a whiteish suspension of the disodium salt of 4,4'-bis-[4''-(2,6-dimethylmorpholino) - 6'' - phenylamino - 1'',3'',5''-triazinyl-(2'')-amino]-stilbene-2,2'-disulphonic acid is obtained. After cooling, the product, which dissolves with difficulty in water, is filtered off, washed once with water and dried in vacuo at 80°.

An almost colourless powder which fluoresces blue in UV light is obtained and which dissolves in dilute alcohol with a vivid violet-blue fluorescence. The product is suitable for the optical brightening of cellulose fibres in aqueous solution containing washing agents.

If instead of phenylamine, one of the arylamines given in column 2 of the following Table I is used and otherwise the procedure given in the example is followed, then optical brighteners are obtained having the appearance given in column 3.

TABLE I

| Example | Arylamine | Appearance |
| --- | --- | --- |
| 2 | 2-methylphenylamine | Almost white powder. |
| 3 | 2-methoxyphenylamine | Yellowish powder. |
| 4 | 2-chlorophenylamine | Do. |
| 5 | 3-methylphenylamine | Pale yellowish powder. |
| 6 | 3-methoxyphenylamine | Do. |
| 7 | 3-ethoxyphenylamine | Do. |
| 8 | 3-chlorophenylamine | Yellowish powder. |
| 9 | 4-methoxyphenylamine | White powder. |
| 10 | 4-acetylaminophenylamine | Do. |

Example 11

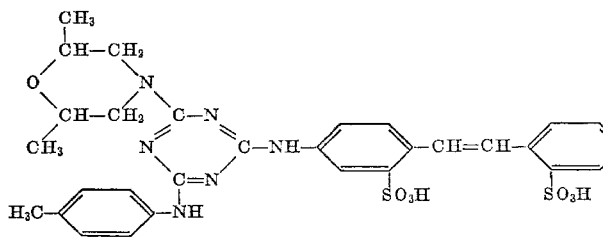

A suspension of the disodium salt of 4,4'-bis[4'',6''-dichloro - 1'',3'',5'' - triazinyl-(2'')-amino]-stilbene-2,2'-

Example 19

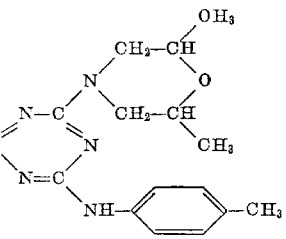

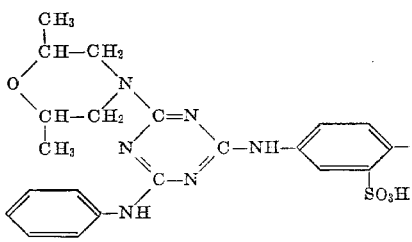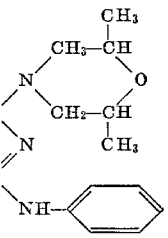

disulfonic acid in a mixture of water and acetone is produced as described in Example 1 from 75 parts of 2,4,6-trichloro-1,3,5-triazine, 82.2 parts of the sodium salt of 4,4'-diaminostilbene-2,2'-disulphonic acid and 21.5 parts of sodium carbonate. 50.5 parts of 2,6-dimethyl morpholine are poured in within 10 minutes at 5–10°. A 15% aqueous solution of 55 parts of sodium carbonate is then added to the reaction mixture at 15° in such a way that this mixture has a pH of 8 to 9. A clear, yellowish solution is obtained. After adding 100 parts of sodium chloride, the whole is stirred for 12 hours at 20–30°. The disodium salt of 4,4'-bis-[4''-chloro-6''-(2,6-dimethylmorpholino)-1'',3'',5''-triazinyl - (2'') - amino]-stilbene-2,2'-disulphonic acid forms a pale yellow precipitate which can easily be filtered off. After drying at 65–70°, the intermediate product is obtained as a yellowish, relatively easily water soluble powder.

15 parts of this intermediate product are distributed in 250 parts of water while stirring, 4.3 parts of 4-methylphenylamine are added, the pH of the mixture is adjusted to 5.5 by the addition of a few drops of concentrated hydrochloric acid and then the whole is refluxed for 6 hours while stirring. The 4,4'-bis-[4''-(p-methylphenylamine)-6''-(2,6-dimethylmorpholino) - 1'',3'',5'' - triazinyl-(2'')-amino]-stilbene-2,2'-disulphonic acid so formed separates out of the acid reaction solution as a yellowish precipitate. To convert it into the disodium salt, the product is filtered off, washed with water, suspended in 250 parts by volume of 20% alcohol and sufficient aqueous sodium hydroxide solution is added at boiling temperature to raise the pH to 11–12. The disodium salt of the compound of the formula given above forms a white, blue fluorescent, crystalline precipitate. After cooling, it is filtered off and dried in vacuo at 80°. The compound so obtained has similar properties to those of the compound described in Example 1.

If the 4-methylphenylamine is replaced by one of the arylamines given in column 2 of Table II and otherwise the procedure given in the example is followed, then a brightener is obtained the appearance of which is given in column 3 of the same table.

TABLE II

| Example | Arylamine | Appearance |
|---|---|---|
| 12 | 2-ethoxyphenylamine | Yellowish powder (salted out with NaOOCH₃). |
| 13 | 3-fluorophenylamine | Pale yellowish powder. |
| 14 | 3-bromophenylamine | Yellowish powder. |
| 15 | 2,5-dimethylphenylamine | Do. |
| 16 | 3,5-dichlorophenylamine | Pale yellowish powder. |
| 17 | 4-chlorophenylamine | White powder. |
| 18 | Naphthyl-(1)-amine | Beige powder. |

24.1 parts of 2,4-dichloro-6-phenylamino-1,3,5-triazine (produced by reacting 2,4,6-trichloro-1,3,5-triazine with an equivalent phenylamine) (J. T. Thurston, Am. Soc. 73, 2983 [1951]), are distributed in 250 parts of water and the suspension is heated to 60–65°. At this temperature, a solution of 20.5 parts of the sodium salt of 4,4'-diaminostilbene-2,2'-disulphonic acid in 225 parts of water is added within 1 hour and the acid liberated is neutralized by the simultaneous addition dropwise of 15% aqueous sodium carbonate solution until the pH of the reaction mixture is 6–6.5. The whole is then stirred at the same temperature and pH until no more alkali is used and no more free amino groups can be traced. At 75–80°, 14.5 parts of 2,6-dimethyl morpholine and an aqueous solution of 4 parts of sodium hydroxide are then added simultaneously, within 30 minutes, to the pale grey, viscous reaction mass. After adding another 0.8 part of sodium hydroxide, the mixture is stirred for 1 hour at 90° and, after cooling, the almost white reaction product is filtered off, washed with water and dried in vacuo at 80°. The product is identical with that according to Example 1.

Example 20

12 parts of aniline are added to 43.5 parts of the sodium salt of 4,4'-bis-[4''-chloro-6''-(2,6 - dimethylmorpholino) - 1'',3'',5'' - triazinyl - (2'') - amino] - stilbene-2,2' - disulphonic acid in 800 parts of water. The pH of the mixture is adjusted to 5.5 with a few drops of hydrochloric acid and then the mixture is heated for 10 hours at 95° while stirring. The difficultly soluble 4,4' - bis-[4''-phenylamino - 6'' - (2,6 - dimethylmorpholino) - 1'',3'', 5'' - triazinyl-(2'') - amino] - stilbene - 2,2' - disulphonic acid formed is filtered off, suspended in 700 parts of water, 4.8 parts of sodium hydroxide and 10 parts of sodium carbonate are added and the whole is heated in a closed vessel for 3 hour at 125–130°.

In this way, the disodium salt of the reaction product mentioned is obtained as almost colourless crystals which are difficultly soluble in water. After cooling, the product is washed with water and dried in vacuo at 80°.

Example 21

A heavy-duty, non-soap detergent mixture consisting of 8 parts of lauryl sulphate, 11 parts of dodecylbenzene sulphonate, 11 parts of sodium tripolyphosphate, 17 parts of tetrasodium pyrophosphate and 37 parts of sodium sulphate is worked up into a paste with 0.2 part of the brightener according to Example 1 in the form of its disodium salt in 170 parts of water. This paste is dried at 60° and then milled. The washing powder obtained has a considerably more white appearance in daylight than one produced without the addition of the optical brightener.

Beautiful white washing powders are also obtained if, instead of the brightener mentioned above, the disodium salt of one of the brighteners given in Examples 2, 5, 12 or 18 is incorporated into the above washing agent preparation and otherwise the procedure given in the example is followed.

Example 22

1 part of cotton household goods is washed for 20 minutes at 80° in 10 parts of a liquor which contains, per litre, 8 g. of the detergent produced according to Example 21; the goods are then rinsed and dried. A dazzling white wash is obtained. Even after repeated washing with this detergent, the goods treated show a very good brightening effect and no undesirable change in shade due to accumulation of brightener.

Example 23

0.3 part of the brightener according to Example 1 in the form of its disodium salt are stirred with 3 parts by volume of 1 N sodium hydroxide solution and 100 parts by volume of water are added. To this mixture, a heavy duty detergent of the following composition is added:

7.8 parts of lauryl sulphate,
11.0 parts of dodecyl benzene sulphonate,
11.0 parts of sodium tripolyphosphate ($Na_5P_3O_{10}$),
16.6 parts of tetrasodium pyrophosphate,
4.6 parts of anhydrous sodium silicate,
1.4 part of carboxymethyl cellulose,
36.8 parts of sodium sulphate, and
8.0 parts of sodium perborate ($NaBO_3 \cdot 4H_2O$).

The mixture obtained is then stirred into a homogeneous paste, dried at 85°, then crushed and finally passed through a sieve.

The washing powder obtained has a considerably more white appearance in daylight than the same powder produced without the addition of the brightener mentioned above.

Example 24

A washing powder of the following composition is produced according to Example 23:

15.2 parts of dodecylbenzene sulphonate,
3.8 parts of lauryl sulphate,
25.6 parts of sodium tripolyphosphate,
7.6 parts of tetrasodium pyrophosphate,
4.8 parts of anhydrous sodium silicate,
1.9 part of magnesium silicate,
5.0 parts of sodium carbonate,
1.4 part of carboxylmethyl cellulose,
0.3 part of the sodium salt of ethylenediamine tetraacetic acid
34.4 parts of sodium sulphate, and
0.25 part of the brightener according to Example 5 in the form of its disodium salt.

Example 25

0.5 part of the disodium salt of the brightener according to Example 6 are added to a heat-liquifiable soap consisting of:

40.0 parts of coconut oil fatty acid sodium soap,
31.0 parts of sodium tripolyphosphate,
9.0 parts of tetrasodium pyrophosphate,
6.0 parts of sodium silicate,
3.0 parts of magnesium silicate,
0.5 part of the sodium salt of ethylendiamine tetraacetic acid,
5.0 parts of sodium carbonate,
5.5 parts of sodium sulphate, and
70.0 parts of water.

The components are well mixed and dried in a spray dryer.

A beautiful white, free-flowing washing powder is obtained which is excellently suitable for the simultaneous washing and optical brightening of cotton.

Example 26

A non-ionogenic washing agent is produced by intimately mixing the following components:

11.0 parts of nonylphenol polyglycol ether containing 15 ethyleneoxy groups,
11.0 parts of water,
33.0 parts of sodium tripolyphosphate,
11.0 parts of tetrasodium pyrophosphate,
10.0 parts of sodium silicate,
20.0 parts of sodium sulphate,
2.0 parts of sodium carbonate,
2.0 parts of carboxymethyl cellulose, and
0.35 part of the disodium salt of the brighter according to Example 15.

Cotton washed at 60–70° with a liquor containing 5 g. per litre of the above washing agent is given a pure white appearance.

Example 27

A light-duty detergent is produced as follows:

20.0 parts of sodium dodecylbenzene sulphonate,
8.0 parts of sodium lauryl sulphate,
2.0 parts of lauric acid mono-N-β-hydroxyethylamide,
8.0 parts of sodium tripolyphosphate,
1.5 parts of carboxymethyl cellulose,
60.5 parts of sodium sulphate
0.35 part of the disodium salt of the brightener according to example 1 and
80.0 parts of water.

The components are stirred into a homogeneous slurry, dried at 60° and then pulverised.

A pure white washing powder is obtained which can be used for the washing and brightening of cotton and rayon fabrics.

Example 28

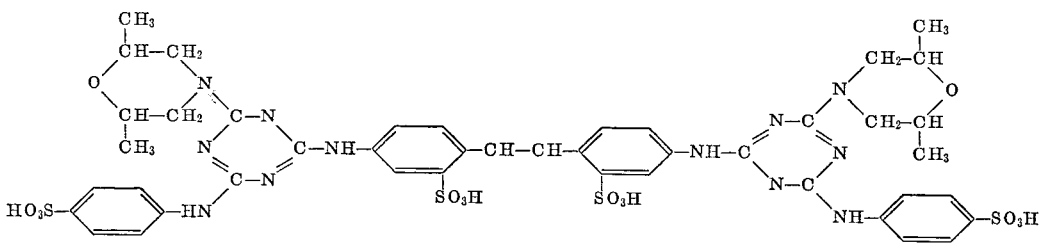

This washing powder also has a considerably more strong white shade in daylight than a washing powder of the same composition produced without the addition of the brightener.

75 parts of 2,4,6-trichloro-1,3,5-triazine are dissolved in 700 parts by volume of acetone. The solution is poured into 1800 parts of a mixture of ice and water while stirring. A solution of 82.8 parts of the sodium salt of 4,4'diaminostilbene-2,2'-disulphonic acid and 21.5 parts of sodium carbonate in 950 parts of water is poured into Example 41

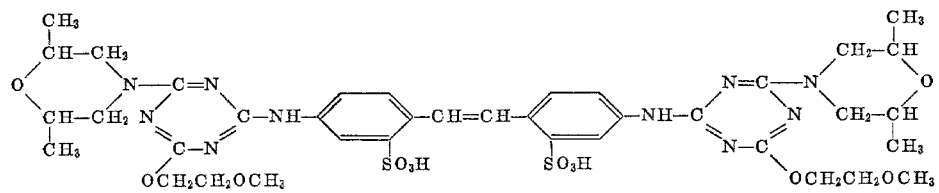

the suspension so obtained of the triazine mentioned. The addition is made within 1 hour at 0–5° while stirring well. At 5–25°, a solution of 69.2 parts of 4-sulphophenylamine and 16 parts of sodium hydroxide in 400 parts of water is added within 30 minutes to the yellowish suspension formed of the disodium salt of 4,4'-bis-[4'',6''-dichloro-1'',3'',5'' - triazinyl - (2'') - amino] - stilbene - 2,2'-disulphonic acid and the acid liberated is neutralised by the simultaneous addition of an aqueous solution of 22 parts of sodium carbonate. The reaction mixture is then stirred at 30–40° until the 4-sulphophenylamine has completely disappeared. 120 parts of 2,6-dimethyl morpholine are added to the mixture obtained within 15 minutes at 50–60°. The temperature of the reaction mixture is then raised to 90° and the acetone is distilled off through a sloping condenser. The solution obtained is then stirred for 1 hour at 90–100° and the pH of the solution is kept at 8.5 to 9 by the addition of sodium hydroxide. 25% of sodium chloride (calculated on the volume of the solution) is then added to the solution at 70° and the whole is stirred for another hour at this temperature. The disodium salt of the compound of the above formula separates out.

After cooling, this salt is filtered off, washed with 20% sodium chloride solution and dried at 80°.

A water soluble, yellowish powder is obtained, the diluted solution of which fluoresces bluish in daylight. The composition obtained can be used in the usual way for the optical brightening of cellulose and polyamide fibres.

If, instead of 4-sulphophenylamine, one of the arylamines given below is used and otherwise the procedure given in the example is followed, then optical brighteners having similar properties are obtained.

Example:

29—2-methyl-4-sulphophenylamine
30—3-methyl-4-sulphophenylamine
31—4-methyl-3-sulphophenylamine
32—2,5-dimethyl-4-sulphophenylamine
33—3-sulphophenylamine
34—3-methoxy-4-sulphophenylamine
35—3-ethoxy-4-sulphophenylamine
36—3-chloro-4-sulphophenylamine
37—2-chloro-5-methyl-4-sulphophenylamine
38—2,5-dichloro-4-sulphophenylamine
39—4-carboxyphenylamine
40—3-carboxyphenylamine.

75 parts of 2,4,6-trichloro-1,3,5-triasine are dissolved in 700 parts by volume of acetone. The solution is poured, while stirring, into 1800 parts of a mixture of ice and water. A solution of 82.1 parts of the sodium salt of 4,4'-diaminostilbene-2,2'-disulphonic acid and 21.5 parts of sodium carbonate in 950 parts of water is poured into the suspension obtained of the triazine mentioned. The addition is made with 1 hour at 0–5° while stirring well. 300 parts of sodium chloride are added to the yellowish suspension formed of the disodium salt of 4,4'-bis-[4'', 6'' - dichloro - 1'',3'',5'' - triazinyl - (2'') - amino]-stilbene-2,2-disulponic acid and the disodium salt mentioned is filtered off. This is slurried in 400 parts of ethylene glycol monomethyl ether at 0–5° and a solution of 16.8 parts of sodium hydroxide, 40 parts by volume of water and 50 parts by volume of ethylene glycol monomethyl ether is added within 1½ hours. The whole is stirred for 12 hours at 0–10°, then 110 parts of 2,6-dimethyl morpholine are added and the whole is heated for 1½ hours at 85–90°. The yellowish solution is clarified while hot, concentrated in vacuo to 300 to 350 parts, dissolved with 1000 parts of water and 200 parts of sodium chloride are added whereupon the disodium salt of the compound of the compound of the above formula separates out on cooling. The product obtained is isolated and dried at 80°.

A yellowish powder is obtained which dissolves well in water. Its diluted solution fluoresces blue-violet in daylight. The product has good affinity to cellulose fibres and, because of its good tolerance with acid aluminium salts, it can be used for the optical brightening of sized paper in the pulp.

If, instead of ethylene glycol monomethyl ether, one of the alcohols mentioned below is used and otherwise the procedure given in the example is followed, then optical brighteners having similar properties are obtained.

Example:

42—ethylene glycol monoethyl ether
43—ethylene glycol monopropyl ether
44—1,2-propylene glycol monomethyl ether
45—1,2-propylene glycol monoethyl ether
46—1,2-propylene glycol monopropyl ether
47—1,4-butylene glycol monomethyl ether
48—ethylene glycol
49—1,2-propylene glycol
50—1,3-propylene glycol Example 51

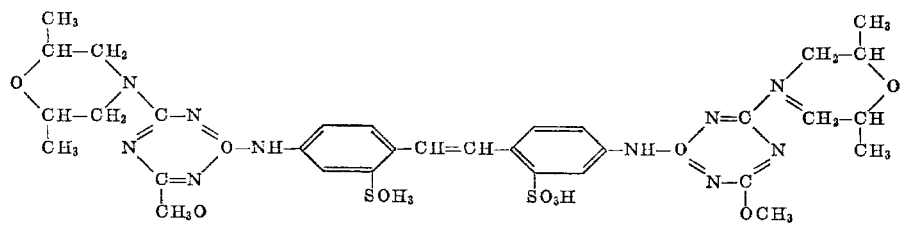

18.9 parts of 2,4-dichloro-6-methoxy-1,3,5-triazine (produced from methanol and 2,4,6-trichloro-1,3,5-triazine according to J. Am. Chem. Soc. 79, 2989 (1951)) are dissolved in 100 parts by volume of acetone and the solution is poured into a mixture of 200 parts of ice and 30 parts of water. A solution of 20.7 parts of the sodium salt of 4,4-diaminostilbene-2,2'-disulphonic acid and 5.5 parts of sodium carbonate in 225 parts by volume of water is added within 1 hour at 0–5° to the suspension obtained. This mixture is stirred for 12 hours at 20° and then, at 46°, 50 parts of sodium chloride are added. The precipitated disodium salt of 4,4'-bis-[4''-chloro-6''-methoxy - 1'',3'',5'' - triazinyl - (2'')-amino]-stilbene-2,2'-disulphonic acid is filtered off and washed once with 10% sodium chloride solution. The moist disodium salt so obtained is slurried in 500 parts by volume of water and 30 parts of 2,6-dimethyl morpholine are added to the suspension. The mixture is then heated for 1½ hours at 85–

(2'')-amino]-stilbene-2,2'-disulphonic acid formed is filtered off, slurried in 2000 parts of water, 100 parts of 2,6-dimethyl morpholine are added and the whole is heated for 2 hours at 90–95°. The yellowish solution obtained is clarified and the reaction product is salted out by the addition of 200 parts of sodium chloride. After drying, the disodium salt of the disulphonic acid of the above formula is obtained as yellowish, water soluble powder, the aqueous solution of which can be used for the brightening of cellulose material.

If instead of methyl mercaptan, equivalent amounts of ethyl-, propyl-, or 2 - hydroxyethyl- mercaptan are used then, with otherwise the same procedure, corresponding end products having similar properties are obtained.

Example 53

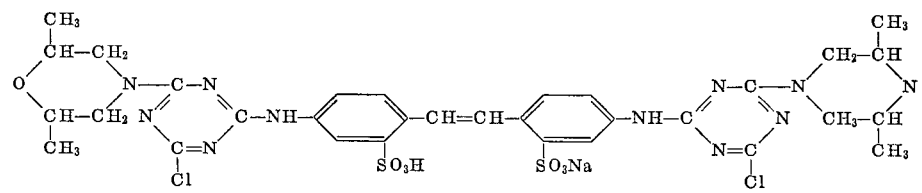

90°, clarified at 85° and the reaction product is salted out with 15% of sodium chloride (calculated on the volume of the mixture). It is filtered off and dried.

The disodium salt of the compound of the above formula is a pale yellowish coloured, water soluble powder which, due to its good affinity to cellulose and good stability to acid, can be used for the optical brightening of cotton fabrics from a synthetic resin finishing bath.

If, instead of 2,4-dichloro-6-methoxy-1,3,5-triazine, equivalent amounts of 2,4-dichloro-6-ethoxy-1,3,5-triazine are used, then the disodium salt of 4,4'-bis-[4''-(2,6-dimethylmorpholino) - 6'' - ethoxy - 1'',3'',5''-triazinyl-(2'')-amine]-stilbene-2,2-disulphonic acid is obtained with otherwise the same procedure.

Example 52

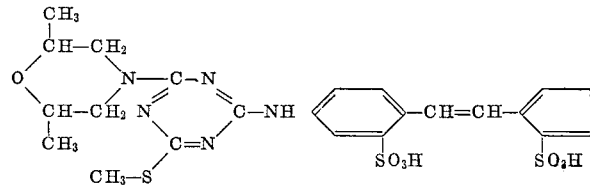

A suspension in water and acetone of the disodium salt of 4,4' - bis - [4'',6'' - dichloro-1'',3'',5''-triazinyl-(2'')-amino]-stilbene-2,2'-disulphonic acid is produced as described in Example 1 from 75 parts of 2,4,6-trichloro-1,3,5-triazine, 82.2 parts of the sodium salt of 4,4'-diaminostilbene - 2,2'-disulphonic acid and 21.5 parts of sodium carbonate. At 5–10°, a solution of 20 parts of methyl mercaptan and 16 parts of sodium hydroxide in 200 parts of water is added within 20 minutes and the whole is stirred for 12 hours at 20–25°. After the addition of 300 parts of sodium chloride, the yellowish disodium salt of the 4,4' - bis-[4''-chloro-6''-methylthio-1'',3'',5''-triazinyl- A suspension of the disodium salt of 4,4'-bis-[4'',6''-dichloro - 1'',3'',5'' - triazinyl-(2'')-amino]-stilbene-2,2'-disulphonic acid in a mixture of water and acetone is produced as described in Example 1 from 775 parts of 2,4,6-trichloro-1,3,5-triazine, 82.2 parts of the sodium salt of 4,4' - diaminostilbene-2,2'-disulphonic acid and 21.5 parts of sodium carbonate. At 5–10°, 50.5 parts of 2,6-dimethyl morpholine are poured in within 10 minutes. Then, at 15°, a 15% aqueous solution of 55 parts of sodium carbonate is added in such a way that the pH of this mixture is 8–9, A clear yellowish solution is obtained. After adding 100 parts of sodium chloride, the whole is stirred for 12 hours at 20–30°. The disodium salt of the compound of the above formula forms a pale yellowish precipitate which can easily be filtered off. After drying at 65–70°, the product is obtained as a yellowish powder which has relatively good water solubility.

The diluted aqueous solution has a blue-violet fluorescence in daylight. The product is suitable for the optical brightening of nylon fabrics from a hot acid bath. As it has a certain affinity to cellulose fibres and because of its good acid stability, it can also be used on cotton material from a bath containing synthetic resin.

Examples 54

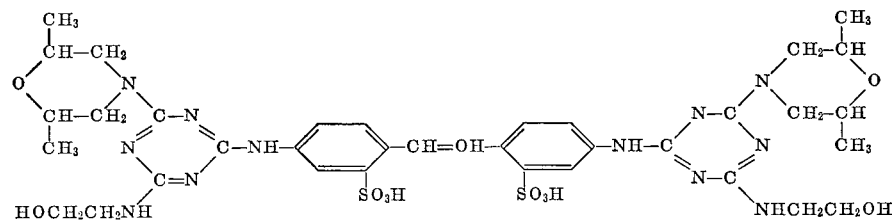

87 parts of disodium salt of 4,4'-bis-[4''-chloro-6''-(2,6-dimethylmorpholino) - 1'',3'',5'' - triazinyl - (2'')- amino]-stilbene-2,2'-disulphonic acid, produced according to Example 26, are heated with 30 parts of β-hydroxyethylamine in 1800 parts of water for 2 hours at 85–95° and the reaction product is salted out by the addition of 200 parts of sodium chloride.

After cooling, the disodium salt of the compound of the above formula is filtered off and dried at 80°.

The disodium salt mentioned is a pale yellowish water soluble powder which can be used for the optical brightening of cellulose material from aqueous solution.

If instead of β-hydroxyethylamine, equivalent amounts of one of the following compounds are used, then with otherwise the same procedure, corresponding end products having similar properties are obtained.

Example:
55—ammonia
56—methylamine
57—dimethylamine
58—ethylamine
59—diethylamine
60—β-methoxy-ethylamine
61—β-ethoxy-ethylamine
62—bis-(β-hydroxyethyl)-amine
63—bis-(β-methoxyethyl)-amine
64—2-(β-hydroxymethoxy)-ethylamine
65—2-(β-methoxyethoxy)-ethylamine
66—β-hydroxypropylamine
67—bis-(β-hydroxypropyl)-amine
68—γ-hydroxypropylamine
69—γ-methoxypropylamine
70—N-methyl-N-β-hydroxyethylamine
71—N-ethyl-N-β-hydroxyethylamine
72—pyrrolidine
73—piperidine
74—morpholine
75—2,6-dimethyl morpholine
76—hexamethylene imine
76a—2-methyl-morpholine.

Example 77

An aqueous slurry of 100 parts of cellulose in 4000 parts of water is mixed in a Hollander with an aqueous solution of 0.1 part of the brightener according to Example 41 for 15 minutes, 2 parts of resin milk and 3 parts of aluminum sulphate are added, the whole is diluted with 20,000 parts of back water which contains 1 g. of aluminum sulphate per litre and the mass is made into paper sheets in the usual way. The paper sheets obtained are clearly brightened.

Example 78

To produce a paper loaded with white pigment, 0.10 part of the brightener obtained according to Example 28 are added to an aqueous slurry containing 85 parts of alpha-cellulose and 15 parts of China clay, the mass is then made up in the usual way into a paper pulp by adding 2 parts of resin milk and 4 parts of aluminum sulfate.

A loaded paper of white appearance is so obtained.

Example 79

Cotton poplin fabric is pad dyed at room temperature in a foulard with a liquor consisting of 535 parts of water, 150 parts of a 50% dimethylol urea preparation of the commercial name "Zeset S" E. I. du Pont de Nemours, Wilmington, Del. USA, 15 parts of magnesium chloride and 2 parts of the brightening agent according to Example 51. The fabric is centrifuged to a liquor content of 65%, pre-dried at 70° and condensed for 5 minutes at 140°.

Cotton fabric of brilliant white appearance which has been given an anticrease processing is obtained.

Example 80

100 parts of chemically pre-bleached perlon yarn are dyed for 40 minutes at 70° in a dye liquor, liquor ratio 1:40, which contains 0.5 part of the brightening agent produced according to Example 53 and 3 parts of acetic acid.

After rinsing and drying, a brilliant white yarn is obtained.

Example 81

120 parts of a usual commercial 50% precondensate in paste form consisting of 80 parts of dimethylol urea and 20 parts of hexamethylol melamine, 10 parts of zinc chloride and 2 parts of the brightener given in Example 41, are dissolved in 1000 parts of water and the pH of the solution is adjusted to 5.0 with acetic acid.

A pre-bleached regenerated cellulose fabric (viscose) is impregnated in a foulard with this solution, centrifuged to 90% liquor content, dried and condensed for 4 minutes at 130–140°.

The anticrease finished fabric obtained has a pleasant white appearance.

Similar effects are obtained on using fabrics made of a mixture of cotton and polyester fibres instead of cotton.

By repeating Example 54, but using in lieu of the 30 parts of β-hydroxyethyl-amine employed therein, equimolar amounts of the sodium salt of the amino acids listed below, and otherwise repeating the aforesaid example except that 400 parts of sodium chloride are used for salting out the product, then the correspondingly substituted compounds falling under Formula IV are obtained.

Example:
82—amino-acetic acid
83—methylamino-acetic acid
84—2-aminoethane-sulfonic acid
85—2-(N-methylamino)-ethane-sulfonic acid
86—γ-methylamino-propionic acid
87—δ-amino-butane-sulfonic acid.

We claim:
1. A white detergent powder, consisting essentially of an anionic or nonionic active detergent compound, and a phosphate selected from the group consisting of alkali polyphosphates and alkali-polymetaphosphates, and an effective brightening amount of a bis-triazinylamino-stilbene optical brightener compound of the formula

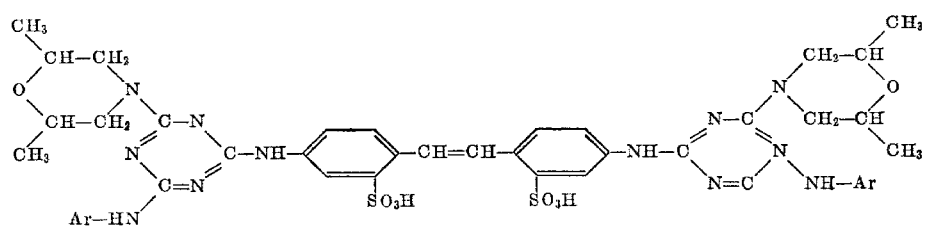

wherein Ar represents a member selected from the group consisting of phenyl, naphthyl-(1) and phenyl substituted by at least one of the following: halogen atoms, lower alkyl groups, lower alkoxy groups, lower alkanoylamino groups.

References Cited

UNITED STATES PATENTS 2,945,762   7/1960   Carroll et al. _____ 260—240

LEON D. ROSDOL, Primary Examiner

M. HALPERN, Assistant Examiner

U.S. Cl. X.R.

252—543

UNITED STATES PATENT OFFICE
CERTIFICATE OF CORRECTION

Patent No. 3,632,491         Dated  Jan. 4, 1972

Inventor(s)  Hyman William Zussman and Heinrich Hausermann

It is certified that error appears in the above-identified patent and that said Letters Patent are hereby corrected as shown below:

Column 3, in the structure "CH-CH$_2$" (with a bond from CH going up) should read "CH$_3$ with CH-CH$_2$ below".

Column 8, in the structure "OH$_3$" should read "CH$_3$".

Column 8, Ex. 19, that part of the structure " 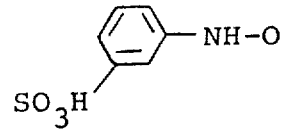 "

should read "  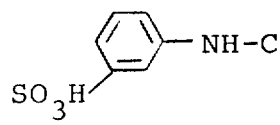 ".

Column 12, Example 51, that part of the structure " 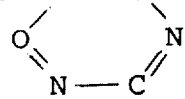 "

should read " 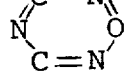 ".

Column 12, Example 51, that part of the structure "N=C (ring with O, N, N—C)"

should read "N=C (ring with C, N, N—C)".

PAGE 2

UNITED STATES PATENT OFFICE
CERTIFICATE OF CORRECTION

Patent No. 3,632,491    Dated Jan. 4, 1972

Inventor(s) Hyman William Zussman and Heinrich Hausermann

It is certified that error appears in the above-identified patent and that said Letters Patent are hereby corrected as shown below:

Column 14, line 31, "775" should read "75".

Column 14, Example 54, "CH=OH" should read "CH=CH".

Column 15, Example 64, "2-(β-hydroxymethoxy)" should read "2-(β-hydroxyethoxy)".

Signed and sealed this 6th day of February 1973.

(SEAL)
Attest:

EDWARD M. FLETCHER, JR.
Attesting Officer

ROBERT GOTTSCHALK
Commissioner of Patents